Patented Sept. 25, 1945

2,385,531

UNITED STATES PATENT OFFICE 2,385,531

PACKAGE

Harold Judson Osterhof, Cuyahoga Falls, and La Verne E. Cheyney, Akron, Ohio, assignors to Wingfoot Corporation, Akron, Ohio, a corporation of Delaware No Drawing. Application October 4, 1941, Serial No. 413,655

2 Claims. (Cl. 206—84)

This invention relates to an oil container made from a plasticized elastoplastic film such as a plasticized rubber hydrochloride film. It also includes the plasticized rubber hydrochloride film. The term "elastoplastic" is used herein as defined by Fisher on page 941, volume 31, of "Journal of Industrial and Engineering Chemistry" (1939).

The oil container of this invention may be constructed in any suitable way. It may be a stiff container lined with the plasticized elastoplastic of this invention such as a cylindrical cardboard carton with metal ends. On the other hand it may be a bag made of the plasticized elastoplastic film. Any suitable bag structure may be used such as, for example, a bag formed by folding a single sheet of the film and uniting the two sides adjacent the fold to make a bag open on one side. This bag may be squared up by placing it over a mandrel and then after filling it may be sealed by drawing the open side flat and sealing the two surfaces of the film at the mouth.

The plasticizers of this invention are oil insoluble and water-insoluble plasticizers. They may be used for plasticizing various oil-insoluble and water-insoluble elastoplastics such as polyvinyl chloride, polyvinyl chloride-acetate, vinyl chloride-vinylidene chloride copolymer, polyvinyl butyral, rubber derivatives such as rubber hydrochloride, etc. These plasticized elastoplastics may be used in the form of a lacquer for coating the interior of a container, or they may be used as films not more than .002 of an inch thick from which a bag may be formed. The bag may be enclosed in a suitable carton.

The simple symmetrical di-esters of phthalic acid of the group consisting or dimethoxyethyl phthalate, diethoxyethyl phthalate, di-2-chloroethyl phthalate, dicyclohexyl phthalate, diphenyl phthalate, ditetrahydrofurfuryl phthalate, and di-o-cresyl phthalate added to rubber hydrochloride film increase its impact strength. Although for greatest strength the plasticizer should be used in an amount at least as great as twenty or thirty per cent by weight of the elastoplastic, it is to be understood that smaller amounts may be used where desirable. For instance, rubber hydrochloride film plasticized with thirty per cent by weight of dimethoxyethyl phthalate made into a bag sealed without reentrant folds has proved satisfactory for paraffin base lubricating oils. In general, the plasticizers are also suitable for use with napthenic base lubricating oils. Anyone of the following plasticizers may be used: phenyl stearate, phenyl benzoate, glyceryl tribenzoate, beta-naphthyl benzoate, alpha-menthyl benzoate, ethyl-p-hydroxy benzoate, propyl-p-hydroxy benzoate, butyl-p-hydroxy benzoate, benzyl-p-hydroxy benzoate, beta-ethoxyethyl-o-benzoyl benzoate, ethoxyethoxyethyl furoate, phenyl salicylate, beta-naphthyl salicylate, dibenzyl maleate, di(ethoxyethoxyethyl) succinate, di-2-chloro-ethyl sebacate, dicyclohexyl sebacate, di(methoxyethyl) adipate, di(ethoxyethoxyethyl) adipate, di(methoxyethyl) phthalate, di(ethoxyethyl) phthalate, di-2-chloroethyl phthalate, dicyclohexyl phthalate, diphenyl phthalate, ditetrahydrofurfuryl phthalate, di-2-chloroethyl hexahydrophthalate, dibenzyl hexahydrophthalate, di-o-cresyl phthalate, methyl phthalyl ethyl glycollate, ethyl phthalyl ethyl glycollate, methyl hexahydrophthalyl ethyl glycollate, ethyl hexahydrophthalyl ethyl glycollate, tri methyl citrate, tri ethyl citrate, tri(methoxyethyl) citrate, 4-chloro-o-phenyl phenol, p-phenyl phenol, o-benzyl phenol, p-benzyl phenol, Santicizer 8 (o- and p-toluene ethyl sulfonamides).

Divisional applications were filed on July 1, 1943, as follows: Serial No. 493,109 claiming diethoxyethyl succinate as a plasticizer; Serial No. 493,110 claiming di-2-chloroethyl sebacate and dicyclohexyl sebacate as plasticizers; Serial No. 493,111 claiming dimethoxyethyl adipate and diethoxyethyl adipate as plasticizers; and Serial No. 493,112 claiming di-2-chloroethyl hexahydrophthalate and dibenzyl hexahydrophthalate as plasticizers.

What we claim is:

1. Rubber hydrochloride film plasticized with about 30 per cent of dimethoxyethyl phthalate to increase its impact strength.

2. An oil package which consists of lubricating oil packaged in a bag of rubber hydrochloride film plasticized with about 30 per cent of dimethoxyethyl phthalate to increase its impact strength, the lubricating oil being in direct contact with the film.

HAROLD JUDSON OSTERHOF.
LA VERNE E. CHEYNEY.